No. 718,838. PATENTED JAN. 20, 1903.
E. S. HAWKINS.
NUT LOCK.
APPLICATION FILED MAY 8, 1901. RENEWED DEC. 29, 1902.
NO MODEL.
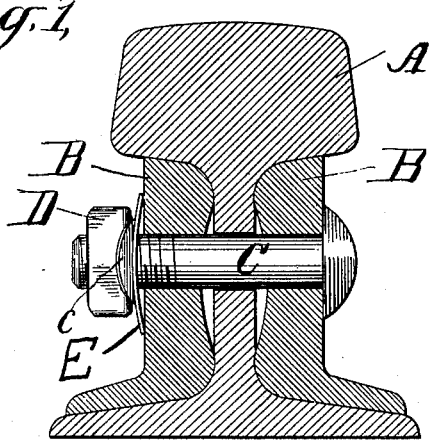
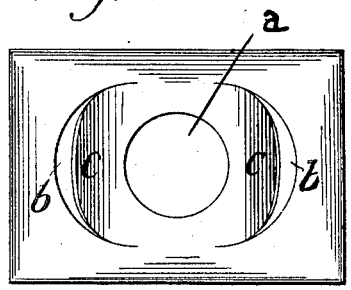
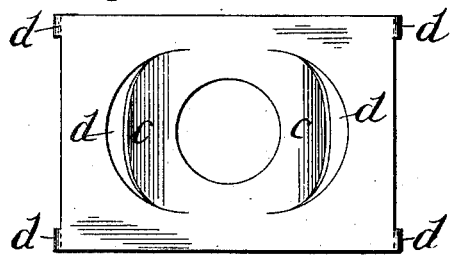
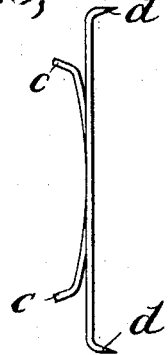
WITNESSES:
INVENTOR
Edward S. Hawkins
BY
ATTORNEYS

UNITED STATES PATENT OFFICE.

EDWARD S. HAWKINS, OF SYRACUSE, NEW YORK.

NUT-LOCK.

SPECIFICATION forming part of Letters Patent No. 718,838, dated January 20, 1903.

Application filed May 8, 1901. Renewed December 29, 1902. Serial No. 137,063. (No model.)

*To all whom it may concern:*

Be it known that I, EDWARD S. HAWKINS, residing at Syracuse, in the county of Onondaga and State of New York, have invented certain new and useful Improvements in Nut-Locks, of which the following is a full, clear, and exact description, such as will enable others skilled in the art to which it appertains to make and use the same.

My invention relates to that class of nut-locks in which a piece of sheet metal is placed like a washer around the bolt beneath the nut and a portion or portions bent outward to engage the side or sides of the nut to prevent it from turning or being unscrewed in service.

The object of the invention is to so shape the said piece of sheet metal that the bolt and nut will be held under tension and not rigidly, as when an edge or inner portion of the sheet is turned or bent over upon itself to engage the edge of the nut after the nut is turned up tight. By my improved nut-lock the nut may be applied to the bolt and turned up tight and held in place without binding the washer, and, further, the nut may be removed by a heavy wrench without bending the washer, as by hammering or turning over its edge.

My invention allows the use of a shorter bolt than many of the nut-locks that have been used, and is thus a great saving in material, weight, time in making and applying, and expense of manufacture. No hammering or bending of the washer is necessary at any time, as it is always in a proper condition to hold and retain the nut and will allow its removal by a wrench.

As the washer is not subjected to hammering or bending, it is not liable to breakage and will outlast other nut-locks formed of washers. Another advantage is that the parts held together—as the rail, fish-plates, bolt, and nut—are not rigidly held so that the parts cannot yield without injury to the thread on the bolt and nut; but the parts are firmly and securely held together, but yieldingly and flexibly, so that the parts cannot suffer and will endure all vibration without strain or separation.

In the drawings hereto annexed and forming a part of this specification, Figure 1 is a transverse vertical section of a rail and fish-plates secured together by a bolt and nut, the latter being locked in place by my invention. Figs. 2 and 3 are front, side, and edge views, respectively, of my improved nut-locking washer for railroad-rails and other metallic devices; and Figs. 4 and 5 are front, side, and edge views of my invention when the plate or washer is not made concavo-convex and is adapted for application to wood, the corners being bent over to enter the wood when the nut is turned down tight upon the front face of the plate.

Referring specifically to the drawings, A represents a cross-section of a railroad-rail, B B two fish-plates, and C a bolt passing through both plates and the web of the rail, as usual.

D represents the nut, of the usual form, the same being preferably square, as shown in the drawings, screw-threaded upon the bolt to hold the fish-plates against the rails, and E represents my improved washer between the inner side of the nut and a fish-plate which forms the nut-lock. The said washer consists of a rectangular piece of sheet metal, preferably steel, having a central aperture $a$ for the bolt to pass through, and on opposite sides of the aperture and extending across the piece are a pair of semicircular or crescent-shaped apertures or slits $b\ b$, with their concave walls toward the central aperture, though not concentric with it, as they differ in curvature. The lips $c\ c$ thus formed by the said concave walls are bent or curved outward to bear upon the opposite sides or faces of the nut and prevent it from turning; but as the lips are curved outward they do not prevent or interfere with the turning in of the nut by a wrench or when necessary the removal of the nut from the bolt by the same instrument. This is facilitated by the round inner corners of the square nut, which is now in common use for rail-bolts. The apertures on opposite sides of the central aperture appear crescent-shaped when the lips are bent outward and when the washer is viewed from either of its sides.

To gain the desired flexibility and tension hereinbefore referred to, the piece or washer E is formed concavo-convex, with its convex side or face outward or on the side from which the lips project. When the nut is turned in, it may receive one or more revolutions after it contacts with the washer until the latter is flat or nearly flat against the fish-plate. The lips are resilient and are forced outwardly when the nut is turned and the corners engage them, but return inward to their place when the sides of the nut are parallel with the sides of the plate, so that the nut is held from turning during any vibratory force and until a heavy wrench is applied. Most washers that form nut-locks are useless after a single application, because they are bent to such an extent or degree when a nut is applied and removed that they break or are weakened, so that they can no longer be depended upon to hold the nut; but with my invention this is not the case, and the washer may be used again and again without danger.

Figs. 4 and 5 show a washer the same as or similar to the one above described, but not concavo-convex in form, but perfectly flat. The corners $d\ d$, &c., of the piece are bent down, so that when applied to a surface of wood they will enter when the nut is turned in tight, and the piece is thus prevented from turning. This washer, however, when applied to a railroad-rail or any other devices providing a shoulder or shoulders for one or more of the edges of the washer to shut against need not be provided with bent corners, as will be obvious, for it will be retained in place by the shoulder or shoulders.

My improved nut-lock may be used for various purposes, and I do not desire to be limited to its use for rail-joints alone.

In some cases a single semicircular aperture $b$ and lip $c$ will be sufficient in a washer to hold the nut. It will also be obvious that the shape of the aperture may be varied without departing from the spirit of my invention. It is only necessary that the aperture be of irregular outline, so that by bending its wall outward a lip will be formed, which construction will still attain one of the advantages of my invention, which consists of a gliding contact between the nut and its locking-lip.

Having described my invention, what I claim as new, and desire to secure by Letters Patent, is—

1. A nut-lock consisting of a perforated washer having semicircular apertures on opposite sides of the perforation, the lips formed by the concave walls of the apertures being curved outward to engage the opposite sides of the nut, substantially as described and shown.

2. A nut-lock consisting of a perforated washer having a pair of semicircular apertures on opposite sides of the perforation, the lips formed by the concave walls of the apertures being curved outward to engage the opposite sides of the nut, and the corners of the washer bent inward, substantially as described and shown.

3. A nut-lock consisting of a perforated washer having a semicircular aperture therein to one side of the perforation and the concave wall formed by the said aperture being curved outward to bear upon one side of the nut and forming a resilient lip which will allow the nut to be turned by a wrench without permanently changing the curvature of the lip, as set forth.

4. A nut-lock, consisting of a centrally-perforated concavo-convex washer having an aperture of irregular outline therein, the lip formed by the wall of said aperture being curved outwardly to bear upon a side of a nut.

5. A nut-lock consisting of a rectangular centrally-perforated concavo-convex plate having a pair of semicircular apertures on opposite sides of the said perforation, the concave walls of the apertures being nearest the perforation, said walls forming curved lips and bent outward to engage the opposite sides of a nut when in position with its sides parallel with the sides of the plate, substantially as described and shown.

In testimony whereof I affix my signature in the presence of two witnesses.

EDWARD S. HAWKINS.

Witnesses:
FRED W. HAMMOND,
GEORGE B. HAMMOND.